United States Patent [19]

Bouchette et al.

[11] Patent Number: 5,122,228
[45] Date of Patent: Jun. 16, 1992

[54] METHOD OF TREATMENT OF WASTE PAPER WITH STEAM

[75] Inventors: Michael P. Bouchette, Appleton, Wis.; Ernest K. C. Yu, Mississauga, Canada

[73] Assignees: Stake Technology Limited, Ontario, Canada; Chesapeake Resources Company, Richmond, Va.

[21] Appl. No.: 624,965

[22] Filed: Dec. 10, 1990

[51] Int. Cl.$^5$ .................................. D21C 5/02
[52] U.S. Cl. ............................ 162/4; 162/5; 162/21; 162/63
[58] Field of Search .............. 162/4, 5, 52, 55, 63, 162/68, 21, 23

[56] References Cited

U.S. PATENT DOCUMENTS

| | | | |
|---|---|---|---|
| 4,163,687 | 8/1979 | Mamers et al. | 162/21 |
| 4,235,707 | 11/1980 | Burke, Jr. | 162/21 |
| 4,540,467 | 9/1985 | Grube et al. | 162/4 |

OTHER PUBLICATIONS

Mamers, "The Siropulper—A New Concept in Wastepaper Recovery", APPITA, vol. 32, No. 2, 1978.

*Primary Examiner*—Karen M. Hastings
*Attorney, Agent, or Firm*—Stevens, Davis, Miller & Mosher

[57] ABSTRACT

Method is disclosed of treatment of waste paper or the like at high temperatures in the range of 160° C. to about 230° C. The furnish is treated in a digester with or without added chemicals but in the presence of saturated steam. The preferred dwell times are in the range of about 1 minute to about 6 minutes. The treated furnish is then discharged from the digester, preferably, but not exclusively, by an explosive discharge.

The advance in the art is in an improved de-inking effect, reduced consumption of chemicals and power. Also, some furnishes previously unsuitable for recycling, have been successfully processed by the method of the invention.

41 Claims, 4 Drawing Sheets

METHOD OF TREATMENT OF WASTE PAPER WITH STEAM

BACKGROUND OF THE INVENTION

The present invention relates to treatment of waste paper, waste paperboard or the like furnish to be recycled.

Due to the ecological and environmental considerations, the cost of virgin fibre and other factors, the optimizing of the recycling of waste paper etc. has now for some time been recognized as a very important aspect of papermaking technology.

One of the problems associated with paper recycling is the removal of print, coating or the like surface treatment to which the paper or cardboard may have been previously subjected. The removal of these components is subject of de-inking technology in paper making. The present invention is particularly, but not exclusively, directed to this field.

Industrial application of the presently available de-inking technologies is associated with relatively heavy use of de-inking chemicals which is expensive and environmentally undesirable. The known methods of deinking of waste paper or the like also require heavy use of cleaning and washing equipment which results in the requirement of a high investment capital. The demands for treatment water are also very high. Energy consumption associated with deinking and cleaning is also relatively high. And the presently available deinking technology has been shown to be inadequate for some furnished, so that the industry is not able to successfully reprocess all of the materials available.

Attempts have been made to alleviate at least some of the problems associated with the deinking of waste paper. For instance, in an article by H. Mamers. "The Siropulper—a new concept in wastepaper recovery" (APPITA, vol. 32, No. 2, pp. 124–128, September, 1978), the use of an explosive release digester is described for defibration purposes which may be used in de-inking. The article suggests that hydrodynamic forces of the explosive discharge combine with the chemical effects of the cooking process to release the ink particles from the fibres, reducing the chemical demand of the process. The increase of the pressure to achieve the required hydrodynamic conditions is effected by injecting pressurized inert gas into a reactor or digester.

The last mentioned method presents advance in that it contains the promise of reduced use of de-inking chemicals thus providing the potential for environmental improvement. The shortening of the processing period is another improvement over previous methods. Yet, certain disadvantages are still associated with this method. In particular, tests conducted in order to determine feasibility of the method described have shown that the quality of the final product of the method often does not reach the desired standard, particularly with respect to the appearance parameters of the final product.

SUMMARY OF THE INVENTION

It is an object of the present invention to further advance the art of recovery of wastepaper and the like material and in particular to maintain the lowest possible use of de-inking chemicals or to even entirely eliminate their use while providing a high quality of the appearance and other parameters of the final product.

In general terms, the present invention provides a method for treatment of waste paper, waste paperboard or the like furnish, or mixtures thereof, containing contaminants that had been introduced in printing, coating or the like surface treatment of the paper, paperboard or the like contained in said furnish, said method comprising the steps of:
 i) feeding said furnish into a digester;
 ii) feeding into said digester saturated steam at superatmospheric pressure and increasing the pressure in said digester to a superatmospheric pressure, substantially due to the saturated steam, to produce a furnish/steam mixture;
 iii) raising the temperature of the furnish contained within the digester, substantially due to the superatmospheric saturated steam introduced in step ii), to a temperature ranging from about 160° C. to about 230° C.;
 iv) maintaining said mixture within the digester at said temperature for a predetermined dwell time;
 v) discharging the furnish from said digester; and
 vi) subjecting the thus discharged furnish to further processing eventually resulting in the production of a recycled sheet of paper, paperboard or the like.

The term "surface treatment" as used in this specification includes techniques such as printing, coating or the like, all well known to those skilled in the art.

The invention is based on a surprising discovery that if wastepaper or the like furnish is cooked in a digester in saturated steam, then the cooking temperatures may be in a substantially higher range than previously accepted temperatures for this stock without impairment of mechanical quality of the final sheet produced from the recycled furnish.

It was further surprising that the high temperatures, in the range as defined above, result in significantly smaller residual contaminant particle sizes than those formed from convention repulping. The degree of reduction of the size of the particles is significant as smaller sized particles are more easily dispersed throughout the sheet. They are less offensive to the eye. Some of them are too small to be seen by the eye.

The smallness of particle size achieved by the inventive process appears to be accompanied by a more effective stripping of the particles from the fiber and, in many instances, in the ability of the papermaking cleaning and screening process to more effectively subsequently remove the particle.

Laboratory tests conducted with the inventive method further show that the need for de-inking chemicals is not only reduced but, in many instances, entirely eliminated, while the final products exhibit visual and other qualities equal to or surpassing those made by presently known methods including the above prior art reference.

In our research, we have found that the temperature, not the pressure used in the digester, is the main factor for achieving the desired quality. The injecting of inert gas was found unnecessary. Also surprisingly, while the explosive discharge from the digester (as opposed to a gradual release of pressure) is advantageous in some instances, it does not appear significantly to influence the de-inking efficiency in other tests conducted.

BRIEF DESCRIPTION OF THE DRAWINGS

The invention will now be described in detail with reference to the following examples based on laboratory tests, and also referring to the drawings, wherein.

DETAILED DESCRIPTION

Test Conditions

The following data, tables and examples are the results of multiple experiments using multiple furnishes and evaluated by multiple evaluation techniques. As we progressed from one experiment to another we expanded and/or modified our experimental design frequently. Thus it will be seen that not all samples were prepared or tested in the same manner from one experiment to another.

The major evaluation techiques used include:

% Debris—a measure of the reduction in contaminant particle size by measuring the amount (%) of reject upon passage through a 0.006" slotted screen.

Image Analysis—a state-of-the-art computer assisted technique using a contrasting magnifier and integrator to identify and quantify residual contaminants in various size ranges. Data presented includes the averate spot size in mm$^2$ and the mm$^2$ dirt/ft$^2$ paper. Generally speaking, the two readings are most beneficial when interpreted together, but average spot size alone has consistently demonstrated the superiority of products made according to the present invention.

Bauer McNett fiber classification—a screening technique used to classify fiber by length. For purposes of the present experimentation, no significant changes in fiber length classifications suggest no changes or degradation to the fibers during repulping.

Tear, breaking length and stretch—common paper industry standard tests to evaluate strength of various pulps and papers.

Expert panel evaluation—Wisconsin Tissue Mills and Chesapeake Corp. belong to industry leaders in the fields of deinking and secondary fiber usage. Various experts within the two companies were used as panelists for sample evaluation. Evaluation techniques included paired comparisons between variables, paired comparisons between a variable and a control and simple judgement descriptions.

Three different furnishes were selected at first. They were groundwood (GR), coated paper (CP) and office waste (OW). Each furnish was processed independently through explosion pulping process using processing variables of consistency, soak chemistry, pulping temperature and pulping time. The pulps thus produced were made into handsheets. Control handsheets were made from the same furnish. Judgements as to handsheet qualities of the first tests conducted were made by visual estimations only. That is to say, the respective pulps were not tested for fibre strength, or general fibre quality. Rather, the judgements included brightness, whiteness, cleanliness, degree of ink dispersion, and the general overall appearance of the handsheets.

The pulping of the furnish was done by taking 50 g of furnish and subjecting it to a pre-processing chemical soak. The chemistries of the soak included:

a) water only;

b) 0.4% (w/w) of Wetsan WT-225 surfactant (a tradename of SANTEC Chemical Co.—active ingredients include <10% 2-butoxyethanol and <20% phosphoric acid) along with 1.25% (w/w) of caustic soda in water. (This is subsequently referred to as "WTM chemistry" for convenience);

c) 0.4% (w/w) Wetsan WT-225+1.25% (w/w) of caustic soda+2.0% (w/w) of hydrogen peroxide in water; and d) 4% (w/w) citric acid in water.

The furnish consistency in the chemical soak was either 50% or 30%. Following the soak (generally about ½ hour), the pulp samples were inserted into the laboratory reactor.

The laboratory reactor was the product of Stake Technology. It is a jacketed, enclosed stainless steel container with a capacity of about 1 liter. Raw, pre-soaked material furnish was added via a top Kamyr ball valve. The discharge valve opened into a reservoir for the recovery of the processed material.

Saturated steam (up to 450 psig) was produced by a high pressure boiler and introduced via an accumulator into the reactor. Two inlets of steam were present, one located immediately below the sampling lid and the other immediately above the Kamyr ball valve.

In a typical operation, pre-soaked raw material was introduced into the reactor which was then closed. Saturated steam at a desired temperature (pressure) was added to bring the reactor and sample temperature and pressure to the desired setting. The controlled temperature variables were 160° C., 170° C., 190° C., 210° C. or 230° C. (corresponding to pressures of about 75, 100, 165, 261 and 391 psig, respectively).

For a predetermined duration of 1, 3, 4 or 10 minutes, the pulps were allowed to stay in the reactor chamber. The material was then discharged explosively across the bottom Kamyr valve by the sudden release of pressure from the pressure prevailing in the reactor to the atmospheric pressure in the reservoir. Test were also conducted in which the explosive release was substituted by gradual pressure release (bleed). The reservoir door was subsequently opened to recover the discharged material for further evaluation.

At the same time, the same furnishes were also pulped in a laboratory, according to the standard prior art technique: 30 g of shreddedfibre was placed in 500 ml H$_2$O, to which has been added 0.5 ml of a 50% caustic soda solution and 0.1 ml of the Wetsan WT-225. The mixture was agitated by a Lightning mixer at a temperature of 160° F. for 20 minutes to 1 hour and then handsheets were prepared. Such samples were then labelled "controls" (e.g. GR2C).

For certain comparative tests referred to hereafter, the Stake Technology reactor was modified to enable injection of inert gases (such as nitrogen) into the reactor before or during the steam treatment of the raw material in the reactor. Gas was introduced from a regulated gas tank via a gas line which opened into the reactor. This setup permitted the simulation of the deinking method as described in the reference mentioned at the outset by enabling increase in reactor pressure over the steam pressure used in the treatment.

The samples were removed and carefully washed three times to remove any residual chemicals. The pulping samples thus obtained were then made into handsheets for evaluation.

Paired comparisons of the various cells were then made, based on single processing variable changes. The winners of these comparisons were then judged by a panel of papermaking experts to be "acceptable" or "unacceptable" to Wisconsin Tissue of Menasha, Wis. (WTM) as a processed pulp furnish, and were then further compared to the WTM handsheets controls to see which was better. The ratings were based on visual inspection and included the collective and combined judgements of the experts. The experts noted samples on overall appearance, brightness, degree of uniformity, and general past experience and knowledge of the trade.

As a result of the encouraging observations made from these experiments, additional samples were then prepared and laboratory comparisons were made by checking Canadian Standard Freeness (Freeness, CSF), bulk, brightness and opacity, tear, breaking length, stretch. Bauer McNett fibre classification was used as a fibre length fractionation technique. Other evaluative techniques included image analysis by way of a computer aided technique identifying, quantifying, and integrating particles visible on the surface of a paper as they contrast with the background. The various options of evaluation used from image analysis in the experiments included mean particle size of residual contaminants and total sample area covered by residual contaminants. Other comparisons involved the % debris collected on a 0.006" screen and, as already mentioned, visual ratings by a panel.

Image analysis measurements show that the mean particle size of the residual contaminants had decreased from those evident in the controls. Furthermore, within the experimental ranges tried, there does not appear to be any serious or consistent change in fibre quality as a function of the processing variable used. Thus, it is assumed that the time, temperature and chemical ranges described are valid for the particular furnish.

Visual examination by experts, and image analysis of residual particle size consistently demonstrates the superiority of pulps and papers produced by the art disclosed in this invention. On a case by case basis, one can often actually pinpoint an optimum blend of processing conditions. In other cases it can be seen that extrapolation or interpolation within the available matrix points readily suggest the best processing conditions and/or limits.

The tests referred to in the following examples are taken from laboratory and industrial tests conducted jointly by the assignees of the present application, Stake Technology Ltd. of Norval, Ont., Canada; and Chesapeake Resources Company, of Richmond, Va., U.S.A.

For easy reference the samples or cells referred to hereafter are designated with their original numbering allocated during the respective tests. The sample numbers appearing in some of the tables therefore are seemingly random and not in a consecutive order with certain numbers left out depending upon the particular Example mentioned. The particular designation numbers, however, are consistent throughout the disclosure.

EXAMPLE 1

A total of nine (9) different cells of office waste furnish (post-consumer waste, consisting of office files, computer printouts, envelopes, etc.) were run, encompassing variations of two consistencies, two chemical pre-treatments, four pulping temperatures and three dwell times. Seven paired comparisons were made. The trial matrix and cell comparison data are shown in TABLE 1 and TABLE 2.

TABLE 1

| OFFICE WASTE FURNISH TRIAL | | | | |
|---|---|---|---|---|
| SAMPLE NUMBER | SOAK CONSIS- TENCY | SOAK CHEM- ISTRY | PULPING TEMPER. °C. | PULPING TIME (MIN) |
| 18 | 30 | WTM | 190 | 1 |
| 19 | 30 | WTM | 170 | 1 |
| 20 | 30 | WTM | 170 | 3 |
| 27 | 30 | WTM | 190 | 4 |
| 137 | 50 | WTM | 210 | 4 |
| 138 | 50 | WTM | 230 | 4 |
| 139 | 50 | $H_2O$ | 230 | 4 |
| 5 | 50 | WTM | 190 | 1 |
| 6 | 50 | $H_2O$ | 190 | 1 |

Table 1 shows that the tests conducted with samples or cells 18–20; 27; 137–139; 5 and 6 were soaked at different consistencies. The soak chemistry corresponded to the WTM chemistry referred to above. In two cells, Nos. 139 and 6, no chemicals were added to the presoak water. The range of temperatures shown is from 170° to 230° C. and the pulping or dwell time range 1 to 4 minutes.

Various pairs of the above cells were then compared with each other to obtain indication of the superiority of the inventive technology and to compare the possible influence of the different processing variables. Expert panel rankings showed that samples preapred by the inventive technology were superior to the controls and that some directions in processing technology variables could be suggested.

With the preliminary results at hand, a larger scale of laboratory tests were conducted with a number of samples, referred to as runs OW 1–18, which included two comparison runs OW2C and OW13C which were processed by way of standard deinking procedure as referred to above. The results are contained in TABLES 2A and 2B, the latter being the continuation of the former. TABLES 2A, 2B also show the process conditions including the chemicals added.

TABLE 2A

| DEINKING OF OFFICE WASTES (PART ONE) | | | | | | | |
|---|---|---|---|---|---|---|---|
| DESIG.: OW; RUN NO: | 1 | 2 | 2C | 3 | 4 | 5 | 6 |
| (a) YIELDS (%): | | 69.32 | 65.9 | | | | |
| (b) FREENESS (CSF, ml.): | 416 | 430 | 558 | 432 | 431 | 469 | 470 |
| (c) BULK (cm$^2$/g): | 1.97 | 1.87 | 2.07 | 1.91 | 1.89 | 1.99 | 2.12 |
| (d) BRIGHTNESS (3.0 g, %): | 60.5 | — | — | 60.2 | 61.4 | 59.3 | 55.4 |
| (e) BRIGHTNESS (1.2 g, %): | 61.0 | 61.5 | 73.3 | 60.2 | 61.7 | 59.7 | 55.9 |
| (f) OPACITY (%): | 92.5 | 90.3 | 86.6 | 93.2 | 91.9 | 93.0 | 93.6 |
| (g) HANDSHEET BASE WT (g): | 63.3 | 62.0 | 59.5 | 61.8 | 58.8 | 59.2 | 60.7 |
| (h) TEAR (mN*M$^2$/g): | 10.4 | 10.5 | 11.8 | 10.6 | 10.5 | 10.2 | 10.9 |

TABLE 2A-continued

DEINKING OF OFFICE WASTES (PART ONE)

| DESIG.: OW; RUN NO: | | 1 | 2 | 2C | 3 | 4 | 5 | 6 |
|---|---|---|---|---|---|---|---|---|
| (i) | BREAKING LENGTH (km): | 3.7 | 3.3 | 3.5 | 3.7 | 3.7 | 3.2 | 3.8 |
| (j) | STRETCH (%): | 2.4 | 2.8 | 2.4 | 2.5 | 2.5 | 2.3 | 2.0 |
| | FIBER CLASSIFICATION (BAUER MCNETT %): | | | | | | | |
| (k) | +14 | 7.1 | 7.1 | 5.0 | 5.6 | 11.2 | 8.0 | 113 |
| (l) | +28 | 10.7 | 20.3 | 16.5 | 16.6 | 17.3 | 19.7 | 17.2 |
| (m) | +48 | 36.0 | 22.6 | 22.4 | 26.2 | 30.1 | 29.3 | 26.5 |
| (n) | +100 | 19.3 | 23.0 | 19.1 | 20.0 | 19.1 | 19.4 | 15.8 |
| (o) | +200 | 7.9 | 8.6 | 6.7 | 9.3 | 7.7 | 7.9 | 7.0 |
| (p) | −200 | 19.0 | 18.4 | 30.3 | 22.3 | 14.6 | 15.7 | 22.2 |
| | PROCESSING CONDITIONS: | | | | | | | |
| (q) | CONSISTENCY: | 50 | 50 | 5.4 | 50 | 50 | 50 | 50 |
| | CHEMICALS: | | | | | | | |
| (r) | WETSAN (% W/W) | 0.4 | 0.4 | 0.4 | 0.4 | — | — | — |
| (s) | NaOH (% W/W) | 1.25 | 1.25 | 1.25 | 1.25 | — | — | — |
| (t) | $Na_2CO_3$ (% W/W) | — | — | — | — | — | — | — |
| (u) | TEMPERATURE (°C.): | 203 | 203 | 71 | 203 | 203 | 203 | 190 |
| (v) | TIME (MIN): | 2 | 4 | 60 | 6 | 2 | 4 | 6 |

TABLE 2B

DEINKING OF OFFICE WASTES (CONT.)

| # | 7 | 8 | 9 | 10 | 11 | 12 | 13 | 13C | 14 | 15 | 16 | 17 | 18 |
|---|---|---|---|---|---|---|---|---|---|---|---|---|---|
| (a) | | | | | | | | | | | | | |
| (b) | 423 | 391 | 367 | 415 | 481 | 410 | 442 | 470 | 456 | 474 | 510 | 458 | 454 |
| (c) | 1.93 | 1.97 | 2.09 | 2.04 | 2.04 | 1.85 | 1.99 | 2.04 | 1.99 | 1.98 | 1.88 | 2.11 | 2.23 |
| (d) | 64.4 | 54.2 | 49.6 | 59.6 | 64.1 | 69.1 | — | — | 64.7 | 63.2 | 67.5 | 62.2 | 66.3 |
| (e) | 63.9 | 56.2 | 47.6 | 59.8 | 64.8 | 69.0 | 66.3 | 61.6 | 65.2 | 63.0 | 67.6 | 63.4 | 67.9 |
| (f) | 88.0 | 94.4 | 98.3 | 93.9 | 90.0 | 90.6 | 92.2 | 88.6 | 92.1 | 92.6 | 89.4 | 92.9 | 92.3 |
| (g) | 60.8 | 59.8 | 61.6 | 57.9 | 60.4 | 61.8 | 60.3 | 60.4 | 62.3 | 61.2 | 60.8 | 57.8 | 58.4 |
| (h) | 10.6 | 10.8 | 7.4 | 9.0 | 11.5 | 10.5 | 11.4 | 10.3 | 11.7 | 11.9 | 8.7 | 11.5 | 12.2 |
| (i) | 4.6 | 3.0 | 2.2 | 3.3 | 3.2 | 3.6 | 2.8 | 3.6 | 3.2 | 3.4 | 3.4 | 4.0 | 2.8 |
| (j) | 2.6 | 2.5 | 2.0 | 2.4 | 2.6 | 2.6 | 2.5 | 2.2 | 2.4 | 2.8 | 2.7 | 2.6 | 2.5 |
| (k) | 11.1 | 9.7 | 7.3 | 8.7 | 12.3 | 10.2 | 9.0 | | 10.1 | 9.9 | 12.2 | 8.1 | 9.2 |
| (l) | 21.5 | 17.6 | 16.7 | 16.5 | 14.9 | 16.7 | 18.8 | | 9.8 | 16.8 | 16.2 | 14.7 | 14.6 |
| (m) | 32.5 | 28.5 | 27.0 | 28.4 | 29.9 | 28.6 | 22.4 | | 15.5 | 27.7 | 25.9 | 26.1 | 26.5 |
| (n) | 19.0 | 17.3 | 18.1 | 17.9 | 17.5 | 16.8 | 21.7 | | 12.2 | 17.5 | 15.6 | 16.9 | 17.2 |
| (o) | 2.8 | 9.8 | 11.3 | 7.8 | 7.7 | 7.6 | 8.7 | | 5.4 | 7.0 | 6.8 | 7.9 | 8.1 |
| (p) | 13.1 | 17.1 | 19.6 | 20.7 | 17.7 | 20.0 | 19.4 | | 37.0 | 21.1 | 23.3 | 26.3 | 24.4 |
| (q) | 50 | 50 | 50 | 50 | 50 | 50 | 50 | 5.3 | 50 | 50 | 50 | 50 | 50 |
| (r) | 0.4 | 0.4 | 0.4 | — | — | — | — | — | 0.4 | — | — | 0.4 | — |
| (s) | 1.25 | 1.25 | 1.25 | — | — | — | 1.25 | 1.25 | — | 1.25 | — | 1.25 | 1.25 |
| (t) | — | — | — | — | — | — | * | * | — | — | * | — | * |
| (u) | 190 | 190 | 190 | 190 | 190 | 190 | 203 | 71 | 203 | 203 | 203 | 210 | 210 |
| (v) | 2 | 4 | 6 | 2 | 4 | 6 | 4 | 60 | 4 | 4 | 4 | 4 | 4 |

*to pH 11

TABLE 3 shows some results of image analysis conducted for the runs OW1–OW18, utilising a state of the art quantitative photographic analysis of background spots (contaminants). The particular program used differentiated and quantified the spots in classes ranging from 0.0400 mm² to 500.00 mm². The data presented in the table includes four important counts used in image analysis. The accumulated field area was 15731.49 sq. mm (0.1693 sq. ft.) for each sample.

TABLE 3

IMAGE ANALYSIS OF PROCESSED OF OFFICE WASTE

| RUN | AVER. SPOT SIZE (mm²) | SQ. MM DIRT/ SQ. FT PAPER |
|---|---|---|
| OW1 | 0.2886 | 839 |
| OW2 | 0.2736 | 903 |
| OW3 | 0.293 | 746 |
| OW4 | 0.2888 | 517 |
| OW5 | 0.2878 | 707 |
| OW6 | 0.2795 | 577 |
| OW7 | 0.2729 | 1350 |
| OW8 | 0.286 | 785 |
| OW9 | 0.4727 | 324 |
| OW10 | 0.3687 | 1145 |
| OW11 | 0.2678 | 429 |
| OW12 | 0.3287 | 598 |

TABLE 3-continued

IMAGE ANALYSIS OF PROCESSED OF OFFICE WASTE

| RUN | AVER. SPOT SIZE (mm²) | SQ. MM DIRT/ SQ. FT PAPER |
|---|---|---|
| OW13 | 0.3368 | 549 |
| OW14 | 0.3321 | 804 |
| OW15 | 0.3078 | 275 |
| OW16 | 0.2944 | 563 |
| OW17 | 0.2698 | 400 |
| OW18 | 0.2715 | 545 |
| OW2C | 1.5911 | 987 |
| OW13C | 0.5148 | 875 |

The surprising result is to be seen in several aspects apparent from the tables. First, very high temperatures, much higher than the accepted norm—see the control samples, when used under the conditions of the present invention, do not result in noticeably higher degradation of the fibre, as witnessed by the values of items (a) through (p) of TABLES 2. Secondly, the absence of any added chemicals in runs OW4–OW6 and OW10–OW12 further indicates the potential of reduced chemical costs and reduced costs of treatment of effluents. Finally, the substantial shortening of the pulping time is also to be noted. TABLE 3 shows that image analysis demonstrates them to be superior to products of conventional deinking methods in that the mean residual particle size is significantly smaller than those found in the control samples.

EXAMPLE 2

Eight different cells of coated furnish (numbered 21-23, 28, 135, 136, 3 and 4) were run encompassing variations of two (2) consistencies, two (2) chemical pre-treatments, three (3) pulping temperatures and three pulping times. The furnish contained bleached sulphite or sulphate papers, printed or unprinted in sheets, shavings, guillotined books or quire waste. A reasonable percentage of papers containine fine groundwood may be present. Eight (8) paired comparisons were made. Matrix processing variables may be found in Table 5.

TABLE 4

COATED FURNISH TRIAL MATRIX

| SAMPLE I.D. | SOAK CONSISTENCY | SOAK CHEMISTRY | PULPING TEMP. | PULPING TIME |
|---|---|---|---|---|
| 21 | 30 | WTM | 170° | 1 |
| 22 | 30 | WTM | 170° | 3 |
| 23 | 30 | WTM | 190° | 1 |
| 28 | 30 | WTM | 190° | 4 |
| 135 | 50 | $H_2O$ | 190° | 4 |
| 136 | 50 | $H_2O$ | 210° | 4 |
| 3 | 50 | WTM | 190° | 1 |
| 4 | 50 | $H_2O$ | 190° | 1 |

The encouraging results seen by a panel of experts dictated further experimentation.

A subsequent upscale trial of coated furnish was conducted with samples CP1 to CP16, and compared with control runs CP2C and CP15C. The procedure used and results obtained are tabulated in TABLES 5A and 5B, the latter being a continuation of the former. Likewise, TABLE 6 shows the result of the results of image analysis of the samples CP1-CP16. Reference may also be had to FIGS. 1-2 and 3-4 showing microscopic photographs of the sheets made from the respective furnishes. Each unit on the scale shown in the drawings corresponds to 25/1000 mm.

TABLE 5A

DEINKING OF COATING PAPER

| | | RUN NO: | | | | | | |
|---|---|---|---|---|---|---|---|---|
| | | CP1 | CP2 | CP2C | CP3 | CP4 | CP5 | CP6 |
| (a) | YIELDS (%): | | | | | | | |
| (b) | FREENESS (CSF, ml.): | 508 | 495 | 531 | 508 | 529 | 538 | 536 |
| (c) | BULK ($cm^2/g$): | 1.67 | 1.69 | 1.72 | 1.70 | 1.65 | 1.72 | 162 |
| (d) | BRIGHTNESS (3.0 g, %): | 54.5 | — | — | 54.6 | 56.4 | 55.8 | 55.2 |
| (e) | BRIGHTNESS (1.2 g, %): | 52.6 | 53.0 | 49.6 | 52.6 | 54.4 | 54.1 | 53.8 |
| (f) | OPACITY (%): | 99.3 | 98.7 | 99.2 | 98.8 | 99.2 | 99.3 | 98.5 |
| (g) | HANDSHEET BASE WT (g): | 60.2 | 62.6 | 60.0 | 60.2 | 61.4 | 61.5 | 59.7 |
| (h) | TEAR ($mN*M^2/g$): | 10.9 | 10.7 | 11.3 | 11.4 | 10.8 | 10.1 | 10.6 |
| (i) | BREAKING LENGTH (km): | 4.6 | 3.9 | 4.3 | 4.4 | 3.9 | 3.7 | 3.6 |
| (j) | STRETCH (%): | 2.6 | 2.9 | 2.4 | 2.6 | 2.6 | 2.7 | 2.8 |
| | FIBER CLASSIFICATION (BAUER MCNETT %): | | | | | | | |
| (k) | +14 | 3.4 | 5.0 | 3.1 | 4.7 | 11.2 | 2.6 | 4.3 |
| (l) | +28 | 14.5 | 17.7 | 14.7 | 13.5 | 17.3 | 11.3 | 14.9 |
| (m) | +48 | 18.6 | 13.7 | 13.6 | 20.9 | 30.1 | 12.1 | 15.0 |
| (n) | +100 | 20.3 | 22.7 | 18.5 | 15.8 | 19.1 | 17.2 | 20.6 |
| (o) | +200 | 7.7 | 11.8 | 8.7 | 6.6 | 7.7 | 8.1 | 8.6 |
| (p) | −200 | 16.5 | 29.1 | 41.4 | 38.5 | 39.7 | 48.7 | 36.6 |
| | PROCESS CONDITIONS: | | | | | | | |
| (q) | CONSISTENCY: | 30 | 30 | 5.4 | 30 | 30 | 30 | 30 |
| | CHEMICALS: | | | | | | | |
| (r) | WETSAN (% W/W) | 0.4 | 0.4 | 0.4 | 0.4 | — | — | — |
| (s) | NaOH (% W/W) | 1.25 | 1.25 | 1.25 | 1.25 | — | — | — |
| (t) | $Na_2CO_3$ (% W/W) | — | — | — | — | — | — | — |
| (u) | $H_2O_2$ | — | — | — | — | — | — | — |
| (v) | $Na_2SiO_3$ | — | — | — | — | — | — | — |
| (w) | $Na_2S_2O_4$ | — | — | — | — | — | — | — |
| (x) | TEMPERATURE (°C.): | 190 | 190 | 71 | 190 | 190 | 190 | 190 |
| (y) | TIME (MIN): | 2 | 4 | 60 | 6 | 2 | 4 | 6 |

TABLE 5B

DE-INKING OF COATED PAPER (CONT.)

| CP | 7 | 8 | 9 | 10 | 11 | 12 | 13 | 14 | 15 | 15C | 16 |
|---|---|---|---|---|---|---|---|---|---|---|---|
| (a) | | | | | | | | | | | |
| (b) | 572 | 580 | 528 | 519 | 523 | 541 | 528 | 556 | 481 | 535 | 1.93 508 |
| (c) | 1.76 | 1.74 | 1.56 | 1.65 | 1.66 | 1.61 | 1.64 | 1.68 | 1.68 | — | 1.67 |
| (d) | 53.6 | 56.5 | 56.9 | 52.6 | 54.3 | 53.2 | 54.3 | 54.4 | — | 51.7 | 54.7 |
| (e) | 54.6 | 54.9 | 54.0 | 51.7 | 52.2 | 52.6 | 52.6 | 53.7 | 54.9 | 98.4 | 51.7 |
| (f) | 98.3 | 98.5 | 99.0 | 98.6 | 99.4 | 98.7 | 98.6 | 99.0 | 98.0 | 60.7 | 99.2 |
| (g) | 58.7 | 59.9 | 60.4 | 60.4 | 60.8 | 61.9 | 61.3 | 60.7 | 60.5 | 13.9 | 60.6 |
| (h) | 12.3 | 8.3 | 9.6 | 11.9 | 11.2 | 11.6 | 11 | 11.4 | 11.3 | 3.9 | 10.2 |
| (i) | 3.2 | 3.1 | 4.3 | 5.3 | 4.2 | 4.3 | 4.1 | 4.7 | 2.4 | | 4.6 |
| (j) | 2.2 | 2.6 | 2.6 | 3.0 | 2.7 | 2.9 | 2.8 | 2.9 | 3.1 | | 2.6 |
| (k) | 3.0 | 4.0 | 4.5 | 6.4 | 5.1 | 5.7 | 5.5 | 4.0 | 6.5 | | 4.2 |

TABLE 5B-continued

| | DE-INKING OF COATED PAPER (CONT.) | | | | | | | | | | |
|---|---|---|---|---|---|---|---|---|---|---|---|
| CP | 7 | 8 | 9 | 10 | 11 | 12 | 13 | 14 | 15 | 15C | 16 |
| (l) | 13.4 | 13.6 | 14.9 | 16.0 | 13.9 | 15.3 | 14.5 | 13.3 | 18.9 | | 12.4 |
| (m) | 13.8 | 14.4 | 15.0 | 24.5 | 21.6 | 18.5 | 21.5 | 18.4 | 17.4 | | 20.5 |
| (n) | 20.5 | 21.3 | 20.1 | 18.9 | 15.8 | 21.4 | 17.6 | 16.5 | 24.9 | | 16.2 |
| (o) | 8.3 | 9.8 | 8.3 | 7.2 | 6.3 | 7.4 | 6.6 | 6.7 | 9.3 | | 6.4 |
| (p) | 41.0 | 36.9 | 37.2 | 27.0 | 37.3 | 31.7 | 34.3 | 41.1 | 23.0 | | 40.3 |
| (q) | 50 | 50 | 340 | 30 | 30 | 30 | 30 | 30 | 30 | 5.4 | 30 |
| (r) | 0.4 | — | 0.4 | — | — | — | — | — | 0.4 | 0.4 | 0.4 |
| (s) | 1.25 | — | — | 1.25 | 1.25 | 1.25 | — | — | 1.25 | 1.25 | 1.25 |
| (t) | — | — | — | — | — | pH 1 | pH 1 | — | — | — | — |
| (u) | — | — | — | 2.0 | — | — | — | — | 2.0 | 2.0 | — |
| (v) | — | — | — | 3.0 | — | — | — | — | 3.0 | 3.0 | — |
| (w) | — | — | — | — | — | — | — | 1.0 | — | — | — |
| (x) | 190 | 190 | 190 | 190 | 190 | 190 | 190 | 190 | 190 | 71 | 170 |
| (y) | 4 | 4 | 4 | 4 | 4 | 4 | 4 | 4 | 4 | 60 | 4 |

TABLE 6

IMAGE ANALYSIS OF COATED PAPER

| RUN | AVER. SPOT SIZE (mm$^2$) | SQ. MM DIRT/ SQ. FT PAPER |
|---|---|---|
| CP1 | 0.1151 | 13.59 |
| CP2 | 0.0657 | 1.94 |
| CP3 | 0.1023 | 5.44 |
| CP4 | 0.1105 | 16.31 |
| CP5 | 0.1262 | 18.64 |
| CP6 | 0.0958 | 19.80 |
| CP7 | 0.1388 | 14.75 |
| CP8 | 0.1377 | 60.18 |
| CP9 | 0.1188 | 37.69 |
| CP10 | 0.0986 | 1.16 |
| CP11 | 0.1315 | 10.87 |
| CP12 | 0.07 | 0.41 |
| CP13 | 0.0877 | 1.55 |
| CP14 | 0.2893 | 8.54 |
| CP15 | 0 | 0.00 |
| CP16 | 0.1315 | 10.87 |
| CP2C | 0.1681 | 295.30 |
| CP15C | 0.2486 | 1860.88 |

EXAMPLE 3

The third series of tests was conducted with groundwood furnish. The furnish was comprised of coated groudwood sections including new printed coated groundwood papers in sheet, section, or shavings, or guillotined books. This grade does not include news quality groundwood papers. In this example, ten (10) different cells were run, encompassing variations of two (2) consistencies, three (3) chemical pre-treatments, four (4) pulping temperatures, and three (3) pulping times. Ten (10) paired comparisons were made. The trial pulping temperatures and three (3) pulping or dwell times. Ten (10) paired comparisons were made. The trial matrix and cell comparison data may be found in TABLE 7.

TABLE 7

| GROUNDWOOD FURNISH, TRIAL MATRIX | | | | |
|---|---|---|---|---|
| SAMPLE I.D. | SOAK CONSISTENCY | SOAK CHEMISTRY | PULPING TEMP. | PULPING TIME |
| 24 | 30 | WTM | 190° | 1 |
| 25 | 30 | WTM | 170° | 1 |
| 26 | 30 | WTM | 170° | 3 |
| 29 | 30 | WTM | 190° | 4 |
| 30 | 30 | WTM & H$_2$O$_2$ | 190° | 1 |
| 131 | 50 | WTM | 210° | 4 |
| 132 | 50 | WTM | 230° | 4 |
| 133 | 50 | H$_2$O | 210° | 4 |
| 134 | 50 | H$_2$O | 230° | 4 |
| 7 | 50 | WTM | 190° | 1 |
| 8 | 50 | H$_2$O | 190° | 1 |

Again, a series of panel comparisons were rated by a panel of experts and the inventive technology gave superior quality products warranting further experimentation.

A subsequent upscale trial of groundwood furnish was conducted with samples GR1 to GR11, and compared with control runs GR2C and GR10C. The procedure used and results obtained are tabulated in TABLES 8A and 8B, the latter being a continuation of the former. Likewise, TABLE 9 shows the result of image analysis of the samples GR1-GR11.

TABLE 8A

| | | DEINKING OF GROUNDWOOD | | | | | |
|---|---|---|---|---|---|---|---|
| | | RUN NO: | | | | | |
| | | GR1 | GR2 | GR2C | GR3 | GR4 | GR5 |
| (a) | YIELDS (%): | | | | | | |
| (b) | FREENESS (CSF, ml.): | 219 | 205 | 239 | 249 | 283 | 259 |
| (c) | BULK (cm$^2$/g): | 1.91 | 1.93 | 1.91 | 1.74 | 1.83 | 1.78 |
| (d) | BRIGHTNESS (3.0 g, %): | 63.2 | 64.5 | — | 63.7 | 64.0 | 63.2 |
| (e) | BRIGHTNESS (1.2 g, %): | 61.8 | 63.1 | 61.8 | 62.8 | 63.5 | 62.6 |
| (f) | OPACITY (%): | 98.2 | 98.5 | 98.2 | 98.4 | 97.9 | 98.1 |
| (g) | HANDSHEET BASE WT (g): | 60.7 | 60.5 | 60.7 | 60.4 | 59.6 | 59.0 |
| (h) | TEAR (mN·M$^2$/g): | 9.7 | 9.6 | 9.7 | 9.7 | 9.4 | 9.1 |
| (i) | BREAKING LENGTH (km): | 3.3 | 4.3 | 3.3 | 4.2 | 4.0 | 4.0 |
| (j) | STRETCH (%): | 2.1 | 2.8 | 2.1 | 2.5 | 2.6 | 2.6 |
| | FIBER CLASSIFICATION (BAUER MCNETT %): | | | | | | |
| (k) | +14 | 7.3 | 5.3 | 4.2 | 15.5 | 5.5 | 5.7 |
| (l) | +28 | 15.8 | 16.2 | 17.5 | 15.1 | 15.1 | 12.2 |
| (m) | +48 | 6.8 | 15.5 | 15.8 | 18.8 | 20.1 | 8.9 |
| (n) | +100 | 26.9 | 14.3 | 14.2 | 12.3 | 12.9 | 14.0 |
| (o) | +200 | 8.4 | 6.7 | 9.3 | 7.5 | 8.0 | 7.8 |

TABLE 8A-continued

| | | DEINKING OF GROUNDWOOD | | | | | |
|---|---|---|---|---|---|---|---|
| | | RUN NO: | | | | | |
| | | GR1 | GR2 | GR2C | GR3 | GR4 | GR5 |
| (p) | −200 | 34.8 | 42.0 | 39.0 | 30.8 | 38.4 | 51.4 |
| | PROCESS CONDITIONS: | | | | | | |
| (q) | CONSISTENCY: | 30 | 30 | 5.4 | 30 | 30 | 30 |
| | CHEMICALS: | | | | | | |
| (r) | WETSAN (% W/W) | 0.4 | 0.4 | 0.4 | 0.4 | — | — |
| (s) | NaOH (% W/W) | 1.25 | 1.25 | 1.25 | 1.25 | — | — |
| (s1) | $H_2O_2$ (% W/W) | — | — | — | — | — | — |
| (s2) | $Na_2SiO_3$ | — | — | — | — | — | — |
| (t) | $Na_2S_2O_4$ (% W/W) | — | — | — | — | — | — |
| (u) | TEMPERATURE (°C.): | 190 | 190 | 71 | 190 | 190 | 190 |
| (v) | TIME (MIN): | 2 | 4 | 60 | 6 | 2 | 4 |

TABLE 8B

| | | DEINKING OF GROUNDWOOD (CONT.) | | | | | | |
|---|---|---|---|---|---|---|---|---|
| | | RUN GR NO: | | | | | | |
| | | 6 | 7 | 8 | 9 | 10 | 10C | 11 |
| (a) | YIELDS (%): | | | | | | | |
| (b) | FREENESS (CSF, ml.): | 261 | 274 | 254 | 218 | 175 | 280 | 200 |
| (c) | BULK ($cm^2/g$): | 1.82 | 1.80 | 1.84 | 1.80 | 2.01 | 1.93 | 1.89 |
| (d) | BRIGHTNESS (3.0 g, %): | 63.7 | 61.9 | 61.2 | 64.5 | 65.8 | — | 64.7 |
| (e) | BRIGHTNESS (1.2 g, %): | 63.4 | 61.3 | 54.3 | 64.0 | 64.3 | 65.0 | 63.7 |
| (f) | OPACITY (%): | 98.3 | 97.7 | 99.4 | 97.6 | 97.9 | 97.8 | 98.1 |
| (g) | HANDSHEET BASE WT (g): | 60.2 | 59.9 | 60.8 | 60.2 | 60.4 | 62.8 | 60.6 |
| (h) | TEAR ($mN*M^2/g$): | 9.0 | 9.7 | 9.6 | 9.7 | 10.8 | 9.2 | 9.3 |
| (i) | BREAKING LENGTH (km): | 3.9 | 3.7 | 3.7 | 4.5 | 4.9 | 3.5 | 4.5 |
| (j) | STRETCH (%): | 2.6 | 2.8 | 2.7 | 2.7 | 2.6 | 2.3 | 2.7 |
| | FIBER CLASSIFICATION (BAUER MCNETT %): | | | | | | | |
| (k) | +14 | 5.4 | 7.8 | 5.1 | 5.3 | 6.8 | | 5.1 |
| (l) | +28 | 1.40 | 15.9 | 14.4 | 14.9 | 18.2 | | 14.7 |
| (m) | +48 | 19.3 | 18.1 | 18.3 | 19.8 | 15.6 | | 19.7 |
| (n) | +100 | 10.9 | 13.3 | 7.9 | 7.1 | 15.4 | | 12.3 |
| (o) | +200 | 8.2 | 8.3 | 12.8 | 11.9 | 7.7 | | 7.4 |
| (p) | −200 | 42.2 | 36.6 | 41.5 | 41.0 | 36.3 | | 40.8 |
| | PROCESS CONDITIONS: | | | | | | | |
| (q) | CONSISTENCY: | 30 | 50 | 50 | 30 | 30 | 5.4 | 30 |
| | CHEMICALS: | | | | | | | |
| (r) | WETSAN (% W/W) | — | 0.4 | — | — | 0.4 | 0.4 | — |
| (s) | NaOH (% W/W) | — | 1.25 | — | 1.25 | 1.25 | 1.25 | — |
| (s1) | $H_2O_2$ (% W/W) | — | — | — | 2.0 | 2.0 | 2.0 | — |
| (s2) | $Na_2SiO_3$ | — | — | — | 3.0 | 3.0 | 3.0 | — |
| (t) | $Na_2S_2O_4$ (% W/W) | — | — | — | — | — | — | 1.0 |
| (u) | TEMPERATURE (°C.): | 190 | 190 | 190 | 190 | 190 | 71 | 190 |
| (v) | TIME (MIN): | 6 | 4 | 4 | 4 | 4 | 60 | 4 |

TABLE 9

| | IMAGE ANALYSIS OF GROUNDWOOD | |
|---|---|---|
| RUN | AVER. SPOT SIZE ($mm^2$) | SQ. MM DIRT/ SQ. FT PAPER |
| GR2 | 0.2137 | 5.05 |
| GR3 | 0.263 | 12.42 |
| GR4 | 0.3068 | 32.61 |
| GR5 | 0.2475 | 24.85 |
| GR6 | 0.1863 | 6.60 |
| GR7 | 0.2959 | 10.48 |
| GR8 | 0.2446 | 36.11 |
| GR10 | 0.263 | 7.77 |
| GR11 | 0.526 | 21.74 |
| GR2C | 0.5917 | 27.96 |

The tests of groundwood also included experiments with old newsprint (ONP) and old telephone books (OTB) with very promising results.

EXAMPLE 4

Two samples of ONP-old newsprint (Nos. ½ and ¾) were processed in accordance by the inventive method using explosive release.

Test sample ½ was cooked for 2 minutes at 160° C. Water only was used as chemistry, and temperature was the only processing variable. The following appearance values prevailed: % debris: 1.7; mean particle size after release: 1.0649; total particle area: 508.818. The expert rating was "excellent".

Subsequent sample ¾ was cooked at 170° C. for 2 minutes. Water only was used chemistry, and temperature was the only processing variable. The following appearance values prevailed: % debris:0.56; mean particle size in $mm^2$:0.8484; total particle area in $mm^2$:285.09. The rating by the panel of experts was "excellent".

EXAMPLE 5

The testing series of groundwood also included samples Nos. 5, 6, 7, 10 and 11, all being furnishes of old telephone books. It is known that the processing of telephone books is severly hindered by the bindings. This prevents the majority of waste paper recyclers from enjoying the benefits of using old telephone books as a cheap and commodeous furnish. We have found that the re-processing of the pages of telephone books posed no problem for the inventive technology, so we challenged the inventive technology with a furnish of concentrated old telephone book binders only. The test results are tabulated in the following TABLE 10. The table shows that the temperature range tested was from 200° to 220° C. All telephone book furnishes listed have been processed with water only, with no chemicals added. However, it can be reasonably assumed that certain chemicals, if added, would improve the results still further.

TABLE 10

OLD PHONE BOOKS - PROCESS AND TEST RESULTS

| SAMPLE | TIME | TEMP. | MEAN PARTICLE SIZE | TOTAL PARTICLE AREA | % DEBRIS | RANKINGS |
|---|---|---|---|---|---|---|
| #11 | 6 | 220° C. | 0.4334 | 49.843 | 0.25 | browning |
| #9 | 2 | 220° C. | .2297 | 49.843 | 1.7 | excellent |
| #7 | 6 | 210° C. | .2794 | 38.003 | 0.91 | very good |
| #6 | 2 | 210° C. | .2753 | 139.324 | 1.3 | excellent |
| #5 | 4 | 200° C. | .3004 | 95.826 | 0.81 | excellent |
| #10 | 4 | 220° C. | .2711 | 46.899 | 1.1 | very good |

Old telephone books are primarily groundwood, but are more difficult to repulp because of the bindings. The success generated by the low mean particle sizes, low % debris and "very good" to "excellent" panelist ratings agains shows the superiority of the inventive technology and process. It can be reasonably assumed from the following discussion and process severity formula establishing the relationship between temperatures and dwell time, that 180° C. is the lower limit for OTB.

EXAMPLE 6

The invention was also tested extensively with the old corrugate container furnish (OCC) (baled corrugate containers having liners of either test liner, jute or kraft) with surprisingly good results tabulated in TABLE 14, together with the respective process data.

TABLE 11

OLD CORRUGATE CONTAINERS

| FURNISH | TIME | TEMP. | MEAN PARTICLE SIZE (mm²) | TOTAL PARTICLE AREA (mm²) | % DEBRIS | EXPERT RATINGS |
|---|---|---|---|---|---|---|
| Good OCC | — | 220° C. | 0.2924 | 426.627 | — | ETC* |
| LFHD control | — | — | 0.2653 | 44.313 | — | average |
| SFHD control | — | — | 0.3727 | 99.145 | — | average |
| Bad OCC | 2 | 230° C. | — | — | 3.4% | excellent |
| Bad OCC | 2 | 210° C. | — | — | 12.6% | excellent |
| UMc. OCC | 2 | 215° C. | — | — | — | SCQ** |
| waxy OCC | 6 | 220° C. | — | — | — | *** |
| Wet strength OCC | 8 | 220° C. | 0.4432 | 17.726 | 0.16% | excellent |

*ETC = equivalent to commercial
**SCQ = superior to commercial quality
*** = better than possible with conventional commercial equipment In TABLE 11, LFHD and SFHD stand for long fibre high density and short fibre high density, respectively. These represent fibres which have been fully cleaned and screened in a conventional commercial deinking system and which have also then been fractionated by fibre length as the last processing prior to use. The fact that the experimental sample shows a roughly equivalent mean residual particle size without any cleaning clearly demonstrates the superiority of the pulps processed by this invention.

Processing treatment for all samples in Table 11 was water only. The combination of image analysis and expert ratings has shown that the inventive technology works for furnishes such as wet strength OCC where it is known that conventional processing is inadequate.

EXAMPLE 7

In this group of examples and tests, comparisons were made to establish the influence of explosive release on the overall de-inking efficiency of the method according to the present invention.

The testing was performed using a batch steam explosion reactor which was modified to accommodate inert gas injection. Shredded office waste and coated paper were used as furnishes for de-inking. Only water was used to give a moisture content of 50% (w/w) in the furnish before processing. The processing was performed based on the publication referred to above for relatively clean wastepaper: 100°-180° C. with nitrogen gas addition to give a 300 psig pressure in the reactor prior to explosive decompression. To test the effect of explosion, a study was performed by slowly releasing the pressure of the reactor (bleed-down) to atmospheric pressure to material discharge. The condition is described as "no explosion".

All treated furnish without further treatment was sent to a laboratory for evaluation of % debris; image analysis (sq. mm of direct per sq. ft. of paper); this is an and average spot size (sq. mm).

The following Table 12 shows the result of tests performed with office waste. Tests A1 and A2 were conducted in accordance with the present invention at high temperatures bringing the pressure within the digester to 261 psig.

The second group of tests B1 and B2 was conducted in accordance with the literature referred to above, the pressurization of the digester to 300 psig having been made by $N_2$.

TABLE 12

OW - HIGH PRESSURE VS. HIGH TEMPERATURE

| PROCESS CONDITIONS | % DEBRIS | IMAGE ANALYSIS (SQ. MM/SQ. FT.) | AVERAGE SPOT SIZE (SQ. MM) |
|---|---|---|---|
| A. High Temperature | | | |
| 1. 210° C./4 min no $N_2$ (261 psig) explosion | 0.45% | 185 | 0.31 |
| 2. 210° C./4 min no $N_2$ (261 psig) no explosion | 0.70% | 302 | 0.39 |
| B. Low Temperature | | | |
| 1. 100° C./4 min add $N_2$ to 300 psig explosion | 25.2% | 4635 | 2.69 |
| 2. 180° C./4 min add $N_2$ to 300 psig explosion | 1.30% | 557 | 0.42 |

Table 12 shows several interesting aspects of the present invention. Firstly, even with the raising of the pressure by $N_2$, but at a increased temperature of 180°, the result was drastically superior to the processing in similar way a mere 100° C. By the same token, the data of the present invention at a lower pressure but higher temperature were superior to the higher pressure and lower temperature of the method described in literature.

Data from the use of the present invention in this comparison further suggest that with explosive discharge, there is only a marginal improvement over non-explosion. This would appear to suggest that pressure is not the major factor in determining the de-inking deficiency.

A similar comparison was made with coated paper and the result from this comparison is tabulated in Table 13. Table 13 points out again to the importance of high temperature, not high pressure for the de-inking efficiency.

TABLE 13

CP - HIGH PRESSURE VS HIGH TEMPERATURE

| PROCESS CONDITIONS | % DEBRIS | IMAGE ANALYSIS (SQ. MM/SQ. FT.) | AVERAGE SPOT SIZE (SQ. MM) |
|---|---|---|---|
| A. High Temperature | | | |
| 1. 190° C./4 min (167 psig) no $N_2$ explosion | 0.36% | 111 | 0.28 |
| 2. 190° C./4 min Add $N_2$ to 300 psig explosion | 0.34% | 116 | 0.40 |
| 3. 190° C./4 min no $N_2$ no explosion | 0.24% | 56 | 0.82 |
| B. High Pressure | | | |
| 1. 100° C./4 min add $N_2$ to 300 psig explosion | 1.6% | 1330 | 0.78 |
| 2. 180° C./1 min add $N_2$ to 300 psig explosion | 0.50% | 129 | 0.35 |
| 3. 180° C./4 min add $N_2$ to 300 psig explosion | 0.41% | 118 | 0.24 |

The tests with coated paper lead to the same general conclusion which can be summarized as follows:

(1) steam temperature (and time) and not pressure is the predominant factor in determining de-inking effectiveness;

(2) injection of inert gases to increase operating pressure does not lead to enhanced de-inkability;

(3) explosive decompression from high pressure may not be an absolute prerequisite to effective de-inking.

Other furnishes, not listed in the above examples and test results, including UV-ink coated papers, latex-bonded air laid cellulosic nonwovens and milk cartons such as were tested during the tests, all with promising results, at least matching and mostly surpassing comparative samples processed by the presently used methods.

The conditions and limits suggested by the experiments described above are not meant to be absolute. Rather, they are intended to show to those skilled in the art that careful balances are necessary between time, temperature, and chemistry in order to optimize the condition of the pulp with specific regard to the attributes required in the final grade of paper, paperboard or the like produced therefrom. For instance, those skilled in the art will quickly recognize that the percentage added of any given chemical is not to be taken as an absolute limiting factor in this invention. The functional specificity of the chemical and its relative strength both play an important role in the determination of exactly how much chemical is added. For example, it is often desirous to raise the pH of the furnish in the deinking operation. It is also well known that there are any number of acceptable chemicals available for this purpose including sodium hydroxide, potassium hydroxide and sodium carbonate. The cationic group (sodium or potassium) may be changed while still yielding the same final effect on the furnish. Or the anionic group (hydroxide or carbonate) may be changed while still yielding the same final effect on the furnish. And of course, there are also the entire spectrum of both inorganic and organic chemicals to chose from. However, due to strength differences and ionization constants of different chemicals different amounts may be required to achieve the same effect. For example, a 0.1N solution of sodium hydroxide in water will be expected to yield a pH of 13. Whereas a 0.1N solution of sodium carbonate in water will be expected to yield a pH of 11.6. Therefore, theoretically, it should take over 10 times as much sodium carbonate as it would sodium hydroxide to achieve the same high pH. But it is also known to those skilled in the art that the addition of further quantities of some chemicals does not bring about a further change in pH, but instead results in a buffering action. Yet, the net effect on the furnish with regards to deinking may be the same.

Furthermore, it will also be recognized that matters are complicated by the sort of dual functionality exhibited by some chemicals. Does one add sodium carbonate to raise the pH? Or does one add sodium carbonate to act as a buffer? Or does one use it for both purposes? Should it therefore be called an alkalating agent, buffer, or both?

As regards the scope of temperatures and dwell times, Stake Technology, one of the co-assignees of the invention, has adopted the concept of severity parameter as recently proposed by Overend and Chornet (Overend, R. P. and E. Chornet, 1987. Fractionation of lignocellulosics by steam-aqueous pretreatments. Phil. Trans. R. Soc. London. Volume A 321, Pages 523–536). Steam treatment severity is defined as:

$$Ro = t * \exp[(T-100)/14.75]$$

where
Ro is the severity parameter;
t is the residence time in the reactor (in minutes); and
T is the steam temperature (in °C.)

Figure 1:
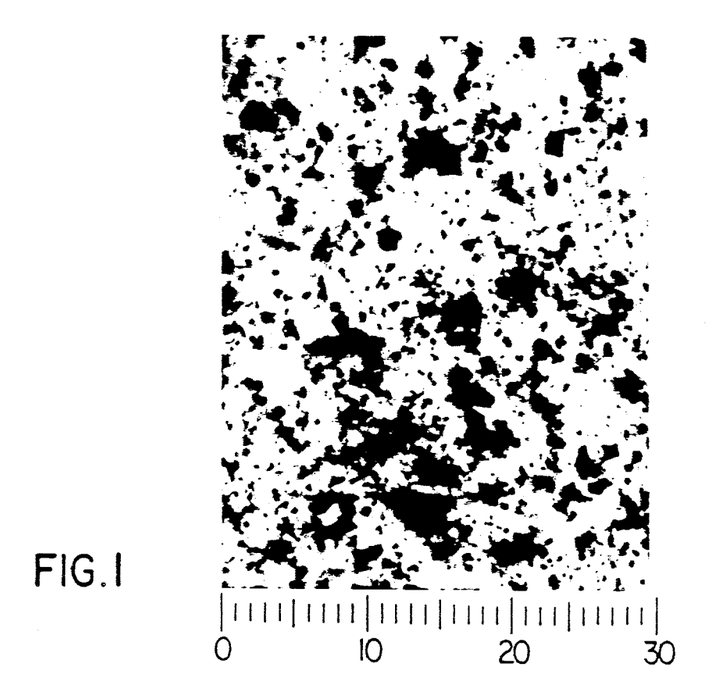
FIG. 1 is a microscopic photograph of a sheet made from a control furnish of coated paper CP 15 C, as referred to hereinafter.
Figure 2:
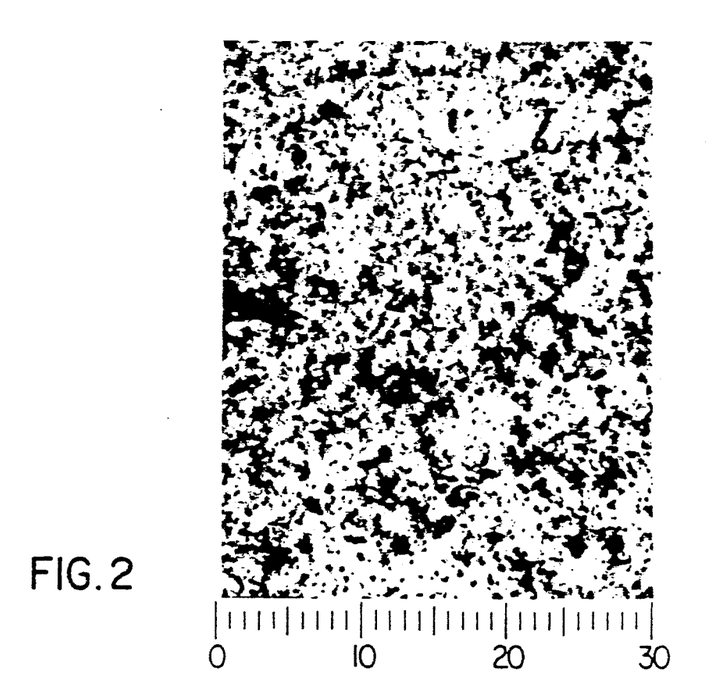
FIG. 2 is a microscopic photograph of a sheet made from furnish CP 15 referred to hereinafter.
Figure 3:
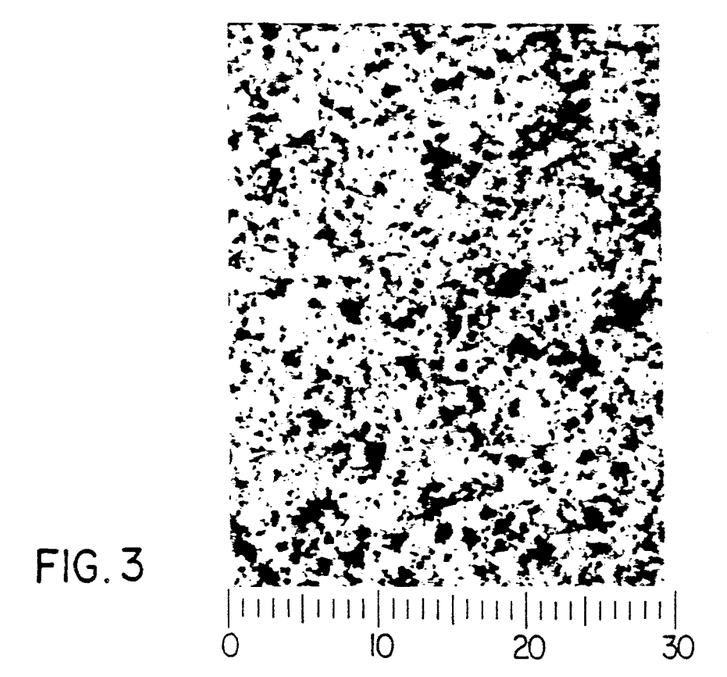
FIGS. 3 and 4 are similar to FIGS. 1 and 2, but show the sheets of furnishes CP2C and CP2, respectively.
Figure 4:
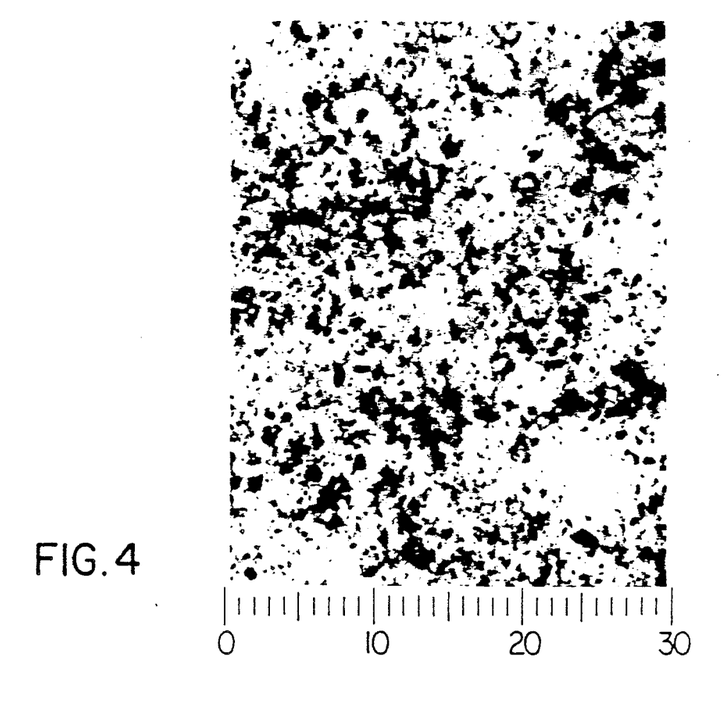
Figure 5:
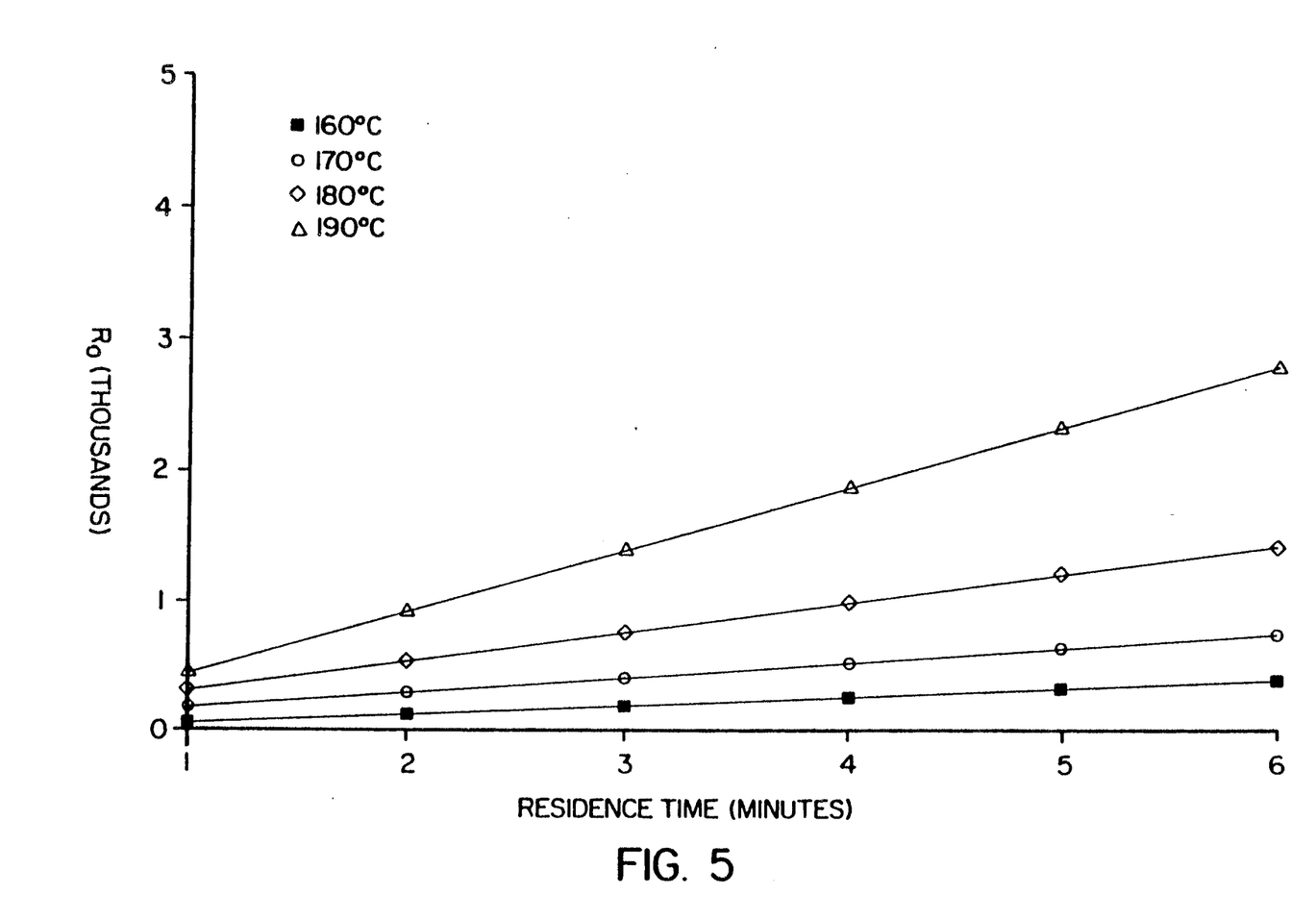
FIGS. 5 and 6 are diagrammatic representations of the definition of steam treatment severity showing the relationship between temperature and dwell time.
Figure 6:
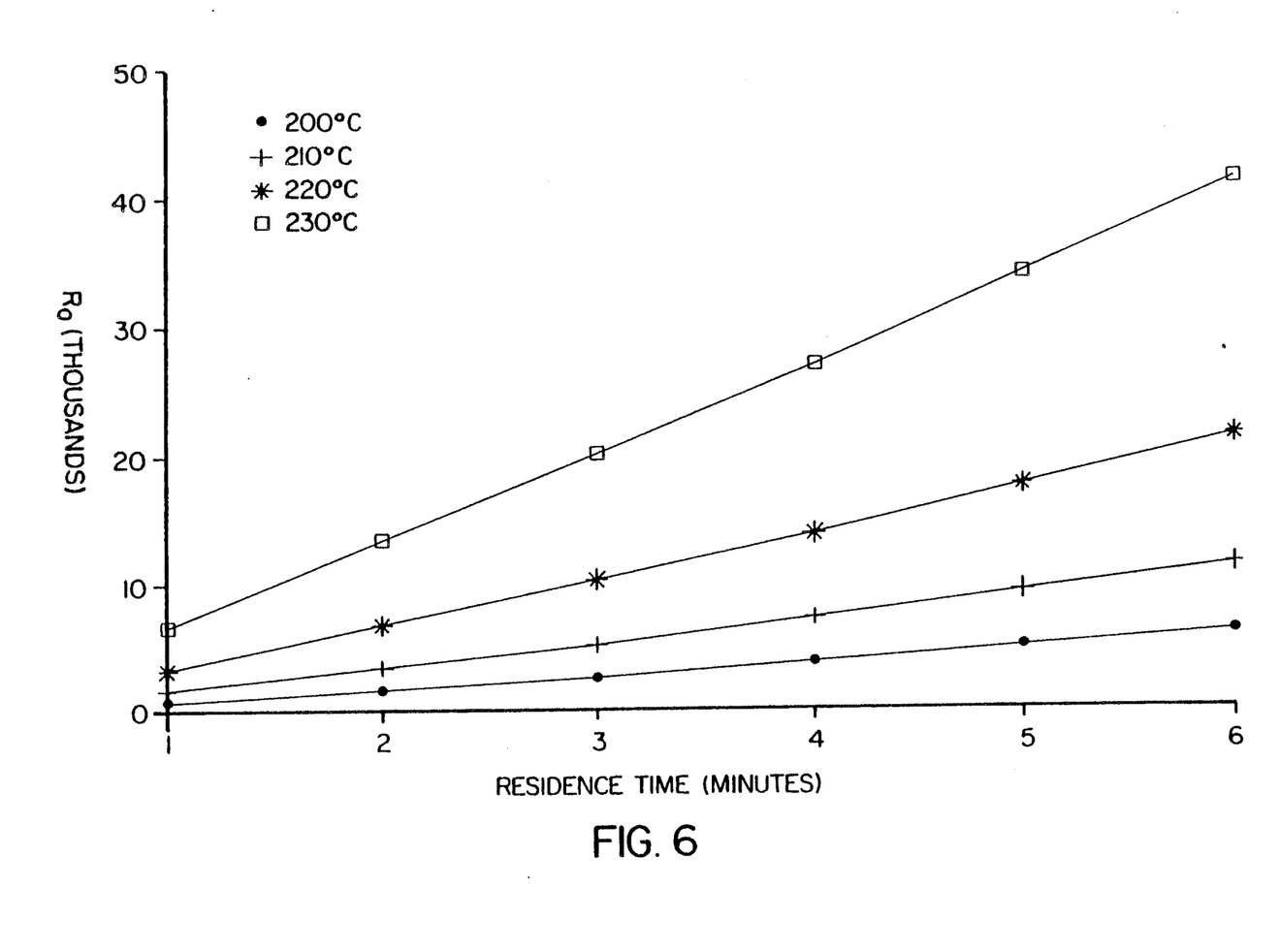

The equation basically states that a particular treatment severity could be achieved by using various combinations of steam temperatures and residence times. It is expected that similar (though not identical) process results (including product quality, downstream processing performance, etc.) will be achieved when the same process severity is used for a particular raw material under conditions which are constant in all other aspects. The Ro as a function of the temperatures and times for the range of 200°–230° C. for 1–6 minutes was illustrated by FIGS. 5 and 6.

The concept of treatment severity is particularly valuable in that it unifies the two major parameters involved in steam treatment: steam temperature and residence times, into a single concept in determining the process conditions. The validity of the concept has been convincingly demonstrated in various applications utilizing Stake Tech's steam-explosion technology. It is likely that the same concept will hold for the wastepaper recycling application even though the concept to data applies primarily to situations which does not involve the use of exogenous chemicals.

In view of the above comments, it will be appreciated that many different combinations may exist in different temperature and dwell time ranges which may differ from the ranges described in the Examples, without departing from the scope of the present invention.

Accordingly, we wish to protect by Letters Patent issued on this application all such embodiments of the method as reasonably fall within the scope of our contribution to the art.

We claim:

1. A method for treatment of waste paper furnish, waste paperboard furnish, or mixtures thereof, containing contaminants that had been introduced in surface treatment of the paper or paperboard contained in said furnish, said method comprising the steps of:
   i) feeding said furnish into a digester;
   ii) feeding into said digester saturated steam at superatmospheric pressure and increasing the pressure in said digester to a superatmospheric pressure, substantially solely due to the saturated steam, to produce a furnish/steam mixture;
   iii) raising the temperature of the furnish contained within the digester, to a temperature ranging from about 190° C. to about 230° C. to thereby increase the pressure in the digester to the range of about 165 psig to about 391 psig;
   iv) maintaining said mixture within the digester at said temperature for a predetermined dwell time;
   v) discharging the furnish from said digester; and
   vi) subjecting the thus discharged furnish to further processing eventually resulting in the production of a recycled sheet of paper or paperboard.

2. The method of claim 1, wherein the predetermined dwell time is about 0.5 minutes to about 20 minutes.

3. The method of claim 1, wherein said further processing includes a sequential screening but is generally devoid of de-inking steps.

4. The method of claim 1, wherein the mixture contains at least one chemical additive selected from the group consisting of alkalating agent, buffer, bleaching agent, detergents, surfactants, solvents, dispersants, chelating agents and sequestrants.

5. The method of claim 1, wherein the mixture contains only furnish and water, and is devoid of added chemicals.

6. The method of claim 4, wherein the mixture contains from about 0 to 3 wt. % of a member selected from the group consisting of alkalating agent, buffer and mixtures thereof; from about 0 to 3 wt. % of bleaching agent; from about 0 to 3 wt. % of a member selected from the group consisting of detergents, surfactants, solvents, dispersants and mixtures thereof, from about 0 to 5 wt. % of a member selected from the group consisting of chelating agents, sequestrants and mixtures thereof, all said weight percent values being dry and active weight of the chemicals on the dry weight of the furnish.

7. The method of claim 1, wherein said furnish is predominantly office waste paper, and wherein the temperature range is from about 190° C. to about 220° C.

8. The method of claim 7, wherein the dwell time is 1 to 10 minutes.

9. The method of claim 7, wherein the dwell time is about 0.5 minutes to about 20 minutes.

10. The method of claim 9, wherein the dwell time is about 1 to 6 minutes.

11. The method of claim 7, wherein the mixture contains from about 0 to 3 wt. % of a member selected from the group consisting of alkalating agent, buffer and mixtures thereof; from about 0 to 3 wt. % of bleaching agent; from about 0 to 3 wt. % of a member selected from the group consisting of detergents, surfactants, solvents, dispersants and mixtures thereof, from about 0 to 5 wt. % of a member selected from the group consisting of chelating agents, sequestrants and mixtures thereof, all said weight percent values being dry and active weight of the chemicals on the dry weight of the furnish.

12. The method of claim 7, wherein the mixture contains solely furnish and water and is devoid of added chemicals.

13. The method of claim 1, wherein said furnish comprises old corrugate containers and/or other unbleached papers or paperboards, and wherein the temperature range is from about 200° C. to about 230° C.

14. The method of claim 13, wherein the dwell time is 10 minutes.

15. The method of claim 13, wherein the dwell time is from about 0.5 minutes to about 20 minutes.

16. The method of claim 13, wherein the dwell time is about 1 to about 8 minutes.

17. The method of claim 1, wherein said furnish is predominantly waste newsprint and/or groundwood, and wherein the temperature range is from about 190° C. to about 200° C.

18. The method of claim 17, wherein the dwell time is 1 to 10 minutes.

19. The method of claim 17, wherein the dwell time is about 0.5 minutes to about 20 minutes.

20. The method of claim 17, wherein the dwell time is about 1 minute to about 6 minutes.

21. The method of claim 17, wherein the mixture contains from about 0 to 3 wt. % of a member selected from the group consisting of alkalating agent, buffer and mixtures thereof; from about 0 to 3 wt. % of bleaching agent; from about 0 to 3 wt. % of a member selected from the group consisting of detergents, surfactants, solvents, dispersants and mixtures thereof, from about 0 to 5 wt. % of a member selected from the group consisting of chelating agents, sequestrants and mixtures thereof, all said weight percent values being dry and active weight of the chemicals on the dry weight of the furnish.

22. The method of claim 17, wherein the mixture contains only furnish and water, and is devoid of added chemicals.

23. The method of claim 1, wherein said furnish is predominantly telephone books and wherein the temperature range is from about 190° to about 220° C.

24. The method of claim 23, wherein the dwell time is 1 to 10 minutes.

25. The method of claim 23, wherein the dwell time is about 0.5 minutes to about 20 minutes.

26. The method of claim 23, wherein the dwell time is about 2 minutes to about 6 minutes.

27. The method of claim 23, wherein the mixture contains from about 0 to 3 wt. % of a member selected from the group consisting of alkalating agent, buffer and mixtures thereof; from about 0 to 3 wt. % of bleaching agent; from about 0 to 3 wt. % of a member selected from the group consisting of detergents, surfactants, solvents, dispersants and mixtures thereof, from about 0 to 5 wt. % of chelating agents, sequestrants and mixtures thereof, all said weight percent values being dry and active weight of the chemicals on the dry weight of the furnish.

28. The method of claim 23, wherein the mixture contains only furnish and water, and is devoid of added chemicals.

29. The method of claim 1, wherein the furnish is predominantly waste coated paper, and wherein the temperature range is from about 190° C. to about 200° C.

30. The method of claim 29, wherein the dwell time is 1 to 10 minutes.

31. The method of claim 29, wherein the dwell time is about 0.5 minutes to about 20 minutes.

32. The method of claim 29, wherein the dwell time is about 1 minute to about 6 minutes.

33. The method of claim 29, wherein the mixture contains from about 0 to 3 wt. % of a member selected from the group consisting of alkalating agent, buffer and mixtures thereof; from about 0 to 3 wt. % of bleaching agent; from about 0 to 3 wt. % detergents, surfactants, solvents, dispersants and mixtures thereof, from about 0 to 5 wt. % of a member selected from the group consisting of chelating agents, sequestrants and mixtures thereof, all said weight percent values being dry and active weight of the chemicals on the dry weight of the furnish.

34. The method of claim 29, wherein the mixture contains only furnish and water, and is devoid of added chemicals.

35. The method of claim 1, wherein the step of discharging the furnish is an explosive discharge of the furnish.

36. A method for treatment of waste paper furnish or waste paperboard furnish, containing contaminants that had been introduced in surface treatment of the paper or paperboard contained in said furnish, said method comprising the steps of:
i) feeding said furnish into a digester;
ii) feeding into said digester saturated steam and increasing the pressure in said digester to a superatmospheric pressure, substantially due to the saturated steam, to produce a furnish/steam mixture;
iii) in the absence of injected inert gases, raising the temperature of the furnish contained within the digester, substantially due to the saturated steam introduced in step ii), to a range from about 160° C. to about 230° C.;
iv) maintaining said mixture within the digester at said temperature for a predetermined dwell time;
v) explosively discharging the furnish from said digester; and
vi) subjecting the thus discharged furnish to further processing eventually resulting in the production of a recycled sheet of paper, or paperboard.

37. The method of claim 36, wherein the predetermined dwell time is about 0.5 minutes to about 20 minutes.

38. The method of claim 36, wherein said further processing includes a sequential screening but is generally devoid of de-inking steps.

39. The method of claim 36, wherein the mixture contains at least one chemical selected from the group consisting of alkalating agents, caustics, carbonates and silicates, buffers, bleaching agents, detergents, surfactants, chelating agents, sequestrants, solvents dispersants, and any combination of two or more of the agents.

40. The method of claim 36, wherein the mixture contains only furnish and water, and is devoid of added chemicals.

41. The method of claim 39, wherein the mixture contains from about 0.1 to 3 wt. % of a member selected from the group consisting of alkalating agent, buffer and mixtures thereof; from about 0 to 3 wt. % of bleaching agent; from about 0 to 3 wt. % of a member selected from the group consisting of detergents, surfactants, solvents, dispersants and mixtures thereof, from about 0 to 5 wt. % of a member selected from the group consisting of chelating agents, sequestrants and mixtures thereof, all said weight percent values being dry and active weight of the chemicals on the dry weight of the furnish.

* * * * *